United States Patent
Shafer

(10) Patent No.: US 11,337,535 B2
(45) Date of Patent: May 24, 2022

(54) SYSTEM AND METHOD FOR SECURING A VOLUME HOLDER TO A BASE

(71) Applicant: Leah Jean Shafer, Denver, CO (US)

(72) Inventor: Leah Jean Shafer, Denver, CO (US)

( * ) Notice: Subject to any disclaimer, the term of this patent is extended or adjusted under 35 U.S.C. 154(b) by 0 days.

(21) Appl. No.: 16/699,295

(22) Filed: Nov. 29, 2019

(65) Prior Publication Data

US 2020/0170431 A1 Jun. 4, 2020

Related U.S. Application Data

(60) Provisional application No. 62/772,943, filed on Nov. 29, 2018.

(51) Int. Cl.
*A47G 23/02* (2006.01)
*F16B 47/00* (2006.01)

(52) U.S. Cl.
CPC .... *A47G 23/0225* (2013.01); *A47G 2200/106* (2013.01); *F16B 47/00* (2013.01)

(58) Field of Classification Search
CPC .......... A47G 23/0225; A47G 2200/106; A47G 23/02; A47G 23/0208; A47G 23/0216; A47G 23/0241; A47G 23/0266; A47G 23/0316; F16B 47/00
See application file for complete search history.

(56) References Cited

U.S. PATENT DOCUMENTS

| | | | | |
|---|---|---|---|---|
| 8,333,353 | B1* | 12/2012 | Silverman | F16M 11/2078 248/205.6 |
| 9,943,191 | B1* | 4/2018 | Elias | A47J 43/18 |
| 2005/0056655 | A1* | 3/2005 | Gary | A47G 19/2261 220/737 |
| 2016/0278557 | A1* | 9/2016 | Esposito | A47G 23/0225 |
| 2018/0255949 | A1* | 9/2018 | Fritz | A47G 19/2227 |
| 2019/0133351 | A1* | 5/2019 | Carroll | A47G 19/22 |

FOREIGN PATENT DOCUMENTS

WO WO-0049919 A1 * 8/2000 ......... A47G 23/0216

* cited by examiner

*Primary Examiner* — Terrell L McKinnon
*Assistant Examiner* — Ding Y Tan
(74) *Attorney, Agent, or Firm* — Adams IP, LLC; James H Adams; Edward B Garner, III

(57) ABSTRACT

A system and method for securing a volume holder to a surface is provided. Generally, the system and method utilizes a base or volume holder containing one or more magnets or ferrous materials. The volume holder and base are attracted to one another through magnetic forces. The base may be attached directly to a surface or the base may be attached to a sub-base. The base or sub-base are attached to a surface and a volume holder is removably secured to the base. The system and method may be temporary, permanent, or semi-permanent.

18 Claims, 7 Drawing Sheets

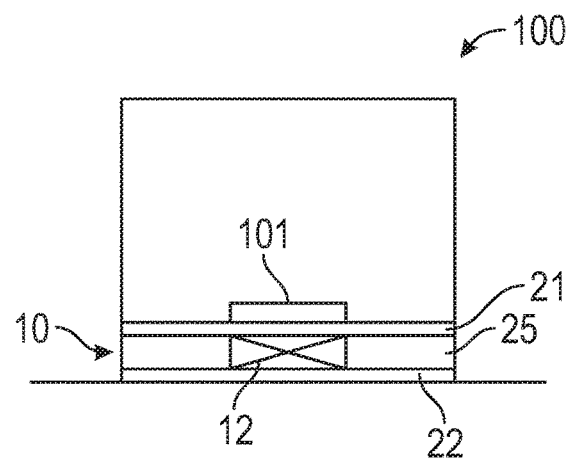
FIG. 14
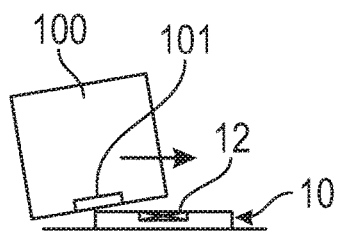  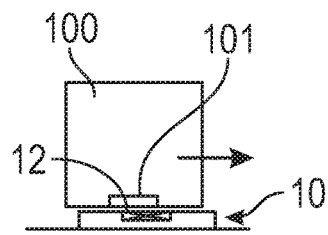  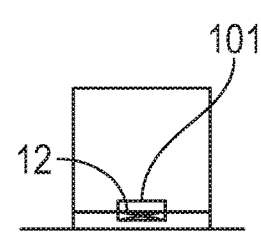
FIG. 15A            FIG. 15B            FIG. 15C
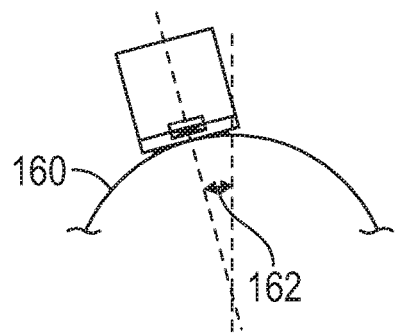  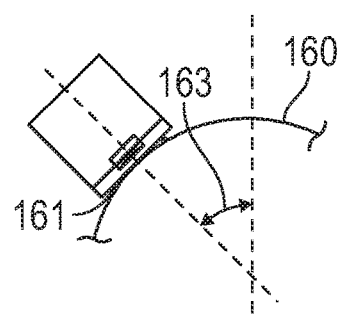  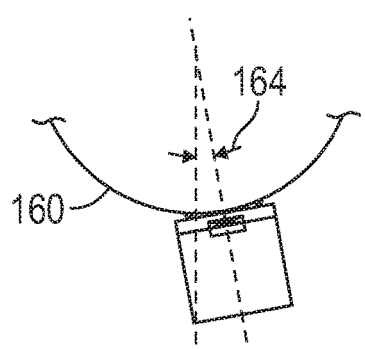
FIG. 16A            FIG. 16B            FIG. 16C

SYSTEM AND METHOD FOR SECURING A VOLUME HOLDER TO A BASE

CROSS REFERENCES TO RELATED APPLICATIONS

This application claims priority to U.S. Provisional Patent Application Ser. No. 62/772,943, filed Nov. 29, 2018, in which said application is incorporated herein in its entirety by reference.

FIELD OF THE DISCLOSURE

The subject matter of the present disclosure refers generally to a system and method for securing a base to a volume holder using magnetic forces.

BACKGROUND

People who are on the move, participating in a sport, or working in a variety of other environments have limited options for retaining and managing a storage volume in a way that is accessible and readily usable, but simultaneously prevents it from being knocked over or lost. In particular, it is difficult to hold, balance, and not spill a beverage container in certain environments or circumstances. Attempts have been made to solve this problem but have failed for numerous reasons.

For example, products have been proposed which describe a magnet attached or embedded directly to the volume holder itself. It is suggested that these magnetized volume holders may then be secured by placing the devices on ferrous objects. Many problems exist with these systems. First, the magnetized volume holders are useless without a ferrous object capable of holding the volume holder in a secure position. It is often the case, especially in sporting activities, that a compatible ferrous material for securing the magnetized volume holder is inaccessible. Second, these systems do not include a flat base and are susceptible to failure based on the ferrous material being irregularly shaped or otherwise difficult for securing the magnetized volume holder. Third, it is known that strong magnets and their resulting magnetic fields may cause damage to mechanical and electronic systems. The prior suggested magnetized systems have the distinct disadvantage of creating a magnetic field wherever the volume holder is placed and thus potentially harming any nearby mechanical or electronic systems.

Other systems have focused on a suction mechanism to attach a volume holder to a surface. Many problems exist with these systems. First, the devices relying on suction must be pressed down firmly to a surface area to create the suction bond. Failure to apply sufficient force will result in the device not forming a strong suction and thus toppling over. Second, the suction devices generally must remain generally erect with respect to the surface. In other words, subjecting suction devices to abrupt changes in orientation dislodges the volume holder from the surface. Third, once the suction is made between the volume holder and the surface, it is often difficult to overcome the force of this suction to remove the volume holder. Finally, it has been found that other systems cannot adequately attach to textured surfaces.

Other products use unreliable mechanisms, such as hook and loop systems, to attach the volume holder to the base. This configuration is problematic for many reasons. The repeated pull upon the volume holder frequently causes the adhesive on the hook and loop systems to fail. Furthermore, with use, the hook and loop system itself wears out and loses its strength. Hook and loop systems all fail to provide trouble-free removal. To function properly the holder must be placed roughly perpendicular to the base, and once secured it cannot be adjusted without complete removal and reattachment. If the volume holder is even partially or temporarily displaced, the hook and loop system's bond is broken and nothing pulls it back towards the base, allowing for spillage or loss. Similarly, hook and loop systems demand precision and focus from the user. Additionally, these systems often result in an abrupt release, resulting in an upset at the time the volume holder is pulled away, causing spillage and loss of the material in the volume holder. In other words, there is no way to smoothly release the volume holder from the base. If the volume holder comes within proximity of the base, but does not make full contact, it will fail to attach.

Similarly, some designs require careful and precise placement of the volume holder into a separate receiving device or base, much like fitting a peg into a hole. This exercise can be risky or difficult to accomplish when the user or the vessel is in motion, causing the user to lose focus on the demands of the situation, or inaccurately place the volume holder, causing it to spill or be lost to the surrounding environment.

Additionally, prior attempts to solve this problem have failed to provide a mechanism to adequately secure the base to anything other than smooth surfaces. First, most prior attempts have failed to describe a system including a separate base. Devices structurally similar to a base, as described herein, will not adhere to the textured or other irregular surfaces found in many crafts or environments, such as those found on inflatable crafts and other vessels. Failure of the base to attach securely to the receiving surface (stand up paddle board, kayak, canoe, lawn mower, and the like) will render the entire volume retention system useless.

Therefore, a need exists in the art for a secure, reliable, and convenient method and system for connecting a volume holder to a secure stationary base in both active and stationary environments.

SUMMARY

A system and method for securing a volume holder to a surface is provided. The system generally comprises a base plate and a mechanism for attaching the base plate to the receiving surface of a device, structure, or vessel. The attachment may be: (a) temporary, then removed and reused; (b) semi-permanent, or (c) permanent.

Because the base and/or volume holder contain one or more powerful magnets or ferrous material, the two are physically attracted, drawing the volume holder to and then magnetically coupling it to the base, when the volume holder is placed or thrust into proximity of the base. Once the volume holder is within the magnetic force of the base it is difficult to tip or spill the volume holder, as the magnetic force self-centers and returns the volume holder to an upright and secure position. This unique magnetic retention design thus enables the volume holder to remain intact while being exposed to impacts, waves, flowing water and all manner of disturbances, and yet also be easily and quickly removed from its base. Due to the nature of magnetic attraction, the volume holder can be removed or replaced at any angle or direction from the plane of the magnetic base without any drag, catching or interference. This multi-angle, multi-directional placement and removal is made possible, in part, due to the flat surface of the receiving plate of the base. Due to this flat base, the volume holder can be slid across it manually or, upon attraction by the magnetic force.

In one embodiment, the base plate may be attached to a vessel by one or more suction cups. The suction cup(s) may be secured to the receiving surface. The use of suction cups provides a readily removable, temporary and transportable base, for use on different receiving surfaces at different times, which can be attached, removed and reattached at will. In order to accommodate flexible or textured surfaces, such as inflatable watercraft and other types of variable surfaces and conditions, various types and sizes of suction cups can be utilized. In one embodiment, the suctions cups may comprise an adhesive technology in which polyurethane, silicon, or a similar, flexible tacky material, is bonded to the inside of the cup. The utilization of polyurethane treated cups in this manner causes adherence improvements. It has been found that this enhanced adherence greatly reduces the risk of loss in turbulent and wet environments. It has also been found that this enhanced adherence increases adhesion to textured materials.

The suction cup may have a rim comprising polyurethane material. In another embodiment the underside of the cup has a layer or film of polyurethane placed thereon. Another embodiment includes polyurethane applied in a pattern that maximizes suction and retention.

In another embodiment the base plate can be attached directly to the receiving surface utilizing glue or one or more adhesive pads. The adhesive pads may be double-sided or single-sided. In another embodiment the base plate can be attached to the receiving surface with a screw or screws. In another embodiment the base plate can be attached to the receiving surface with a snap-on device where the snap-on device is secured to the receiving surface utilizing screws, adhesive pad(s), glue or other mechanisms known in the art.

In one embodiment, the bottom plate of the base has recessed cavities to receive and retain the suction cups or other types of attachment elements. The top of the suction cups may slide into place. This embodiment allows for suction cups to be removed and cleaned or replaced easily. In another embodiment, a plate may be secured to the receiving surface. This plate may contain a set of male attachment elements that match the cavity cut-outs in the magnetic base plate, which then permits the two plates to be connected together, securing the magnetic base plate to the location on the device/vessel selected.

The size and shape of volume holder will vary depending on the intended contents (e.g. beverage can, beverage bottle, wallet, phone, electronics, food, keys, credit cards, and the like). The volume holder may be equipped with a snap lid to keep the volume free of contaminants that may exist in the operating environment, and to further protect against possible contamination, spilling or loss of the item(s) within the volume holder in the event that it is knocked askew.

The volume holder may automatically attract to and self-center on the base, using magnetic force. In some embodiments, the top surface of the base may be generally smooth from edge to edge. This embodiment allows for the volume to be able to easily slide across the surface to the centroid of the magnetic force. It further allows for the user to toss the volume onto the base resulting with the same self-centering effect from the magnetic forces. Furthermore, the smooth surface of the base and magnetic attraction between components allows the volume holder to be retained even if it only comes in partial contact with the base (e.g. "half-on, half-off"). In yet other embodiments, the top surface of the base may comprise a textured surface. In this embodiment the friction of the textured surface may prevent slipping.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 14 is a diagram representing certain components of one embodiment of the disclosed volume holder and base for connecting the volume holder to the base according to the present invention;

FIG. 15A is a diagram depicting the volume holder self-righting and self-centering on the base according to the present invention;

FIG. 15B is a diagram depicting the volume holder self-righting and self-centering on the base according to the present invention;

FIG. 15C is a diagram depicting the volume holder self-righting and self-centering on the base according to the present invention;

FIG. 16A is a diagram depicting the volume holder maintaining its magnetic attraction to the base according to the present invention;

FIG. 16B is a diagram depicting the volume holder maintaining its magnetic attraction to the base according to the present invention;

FIG. 16C is a diagram depicting the volume holder maintaining its magnetic attraction to the base according to the present invention;

DETAILED DESCRIPTION

Figure 1A:
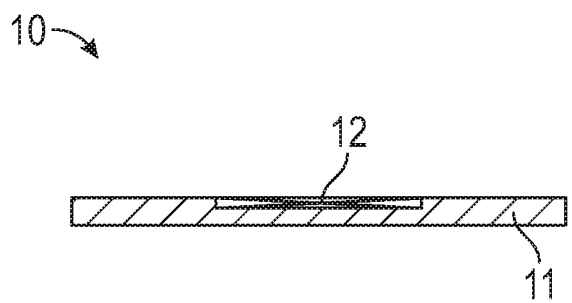
FIG. 1A is a cross-sectional view of one embodiment of the disclosed base for connecting a volume holder to a base according to the present invention.

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For instance, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

As set forth herein, a device, system and method relating to securing a volume holder to a base is disclosed. In a particular embodiment, the base comprises at least one magnet and the volume holder comprises at least one magnet attracting element. It is preferred that the one magnet generally be comprised of a ferromagnetic material such as iron, nickel, cobalt, gadolinium, dysprosium or alloys such as steel that also contain specific ferromagnetic metals such as iron or nickel. The magnet may be a neodymium or chemically similar magnet Generally, the base and volume holder are attracted through ferromagnetism by which certain materials, such as iron, may form permanent magnets, or are attracted to magnets. It is understood that certain materials exhibiting ferromagnetic properties may also be utilized within the volume holder or base.

Described in greater detail below, a system for securing a volume holder to a surface is provided. In one embodiment the system may provide for a volume holder having a top and a bottom. Preferably, the volume holder has a ferrous material or magnet connected thereto or embedded therein. A base may also be provided which may be a substantially flat first plate and a second plate. The first plate is oriented furthest away from the surface when the base is mounted to a surface. As such, the first plate is in contact with the volume holder. In some embodiments the first plate may comprise a ferrous material. In yet other embodiments the first plate does not comprise a ferrous material. A magnet is provided which may be attached below the first plate. In order to help center the volume holder on the base, the magnet may be located towards the center half of the area of the first plate.

The first and second plates may be spaced apart such that a volume of area is formed between the plates. In this embodiment the magnet may be located within the volume of area. Additionally, a sealing element may be attached to the first and second plate around the perimeter of the plates. In this embodiment, the sealing element may create a barrier between the volume of area between the plates and an outside environment. In some embodiments, the sealing element extends at least partially to the upper side of the outer perimeter of the first plate and creates a protrusion from the first plate and forms a lip around the base of the first plate.

Certain embodiments and methods of the present invention utilize a sub-base. In these embodiments the sub-base is attached to a surface and the base is attached to the sub-base. The sub-base and base may have attachment elements to attach the two together. These attachment elements may comprise male and female connection devices, key-hole style couplings, suction cups, hook and loop systems, and other attachment mechanisms known in the art. The attachment mechanism may comprise the bottom plate of the base having a cavity therein for receiving at least one attachment element for securing the base to the sub-base.

Other embodiments of the present invention comprise a substantially flat single-piece base having a cavity inside the center half of the area of the base to accept a magnet therein. Embodiments may comprise keyhole configured cavities to receive the head or a suction cup or other attachment element. A cover may be placed and secured over the magnet cavity and magnet to form a flush or clean appearance or to secure the magnet in place.

A method for securing a volume holder to a surface is additionally disclosed. Utilizing the disclosed method, in a preferred embodiment, a user is provided a volume that has a ferrous material connected to the bottom. The user is also provided a substantially flat base having a magnet located within the center half of it. A user secures the base to a surface and positions the volume holder within range such that the magnetic forces of the base and volume holder cause the volume holder and base to attract and connect. This method may be utilized with the various embodiments of the base and volume holder described in greater detail above and below.

FIGS. 1-24 provide views and illustrations of the various embodiments of the systems and methods set forth herein. As set forth in FIG. 1A, a base 10 is provided. As depicted, the base 10 may comprise a plate 11 and a magnet 12. Various embodiments of the invention may comprise the plate configured such that the magnet 12 is secured from the top of the plate 11. As described in this section, the top of the plate is the side of the plate nearest the volume holder and the bottom of the plate is the side of the plate farthest away from the volume holder. As illustrated in FIG. 1A, a magnet may be inserted from the top of the base. In some embodiments a cover plate may be configured to conceal the magnet. In other embodiments, as illustrated in FIG. 21-FIG. 24, the base may comprise a plate having a cavity located on the bottom side of the plate. In this embodiment, a magnet is secured from the underside of the plate into a cavity or other opening inside the base. In some embodiments a cover may be placed above or below the magnet to conceal the magnet therein. The base 10 may comprise more than one magnet 12. The base 10 may comprise a plurality of magnets 12. The base 10 may comprise a plurality of magnets 12 encased in a single enclosure.

Figure 1B:
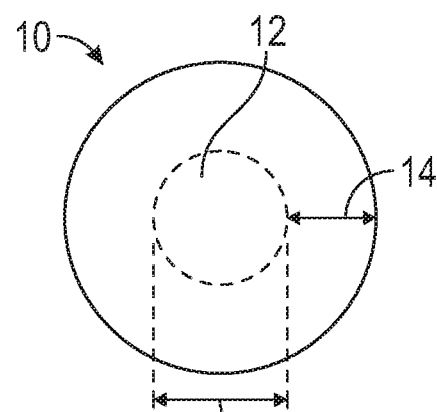
FIG. 1B is top view of one embodiment of the disclosed base for connecting a volume holder to a base according to the present invention.

FIG. 1B illustrates the base 10 broken generally into the center area 13 of the base 10 and the outer area 14 of the base 10. In a preferred embodiment, the magnet 12 is located substantially within the center area 13 of the base 10. It is possible for the magnets 12 to be located in the outer area 14 of the base alone, or in addition to having magnets being located within the center area 13 of the base. In a preferred embodiment, the magnets 12 are located within the center area of the base 10 in order to attract a volume holder 100 towards the center area of the base 10.

Figure 2A:
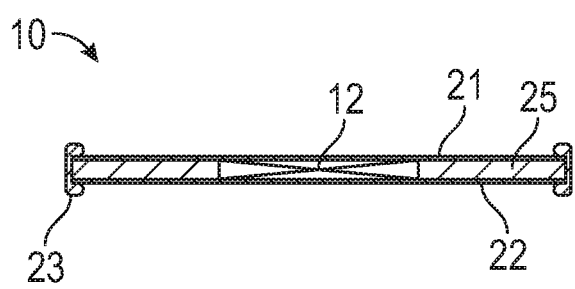
FIG. 2A is a cross-sectional view of one embodiment of the disclosed base for connecting a volume holder to a base according to the present invention.
Figure 2B:
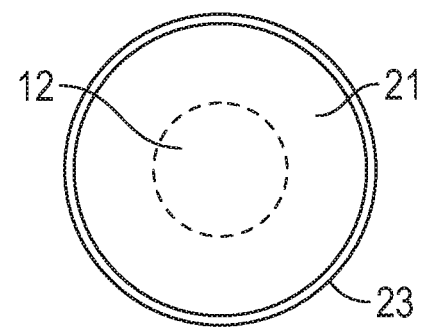
FIG. 2B is top view of one embodiment of the disclosed base for connecting a volume holder to a base according to the present invention.
Figure 21:
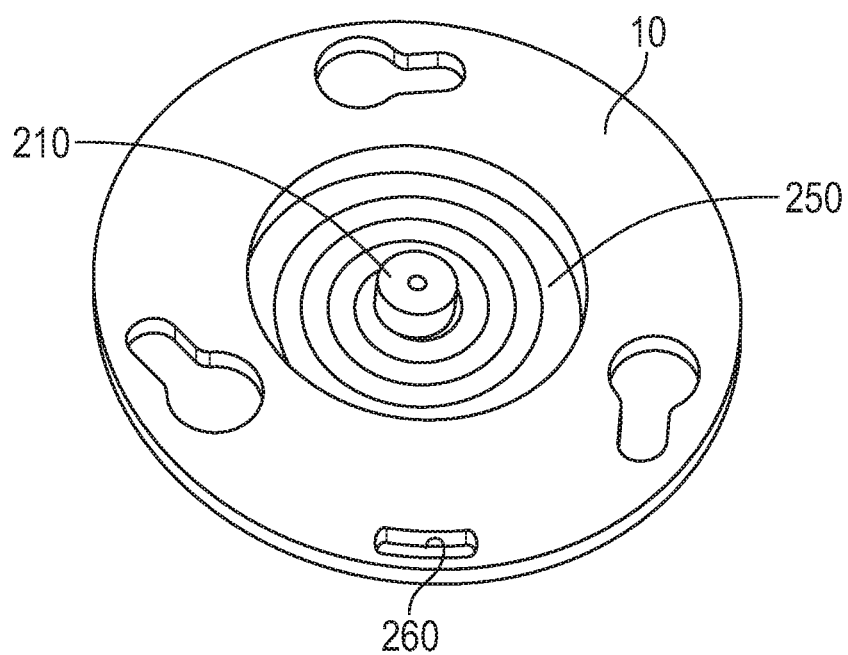
FIG. 21 is a bottom perspective view of one embodiment of a base according to the present invention.

As illustrated in FIG. 1A and FIG. 21, the base may comprise a single plate. In other embodiments, as illustrated in FIG. 2A, the base may comprise an upper plate 21 and a lower plate 22. In the two plate embodiment, the two plates are defined by a volume 25 between the upper plate 21 and lower plate 22, in which a magnet 12 may be located. The plates may be a ferrous or non-ferrous material. In one embodiment, the upper plate 21 is a ferrous material. As illustrated in FIG. 1A, the base plate 11 may have an embedded magnet 12 that is substantially flush with the top of the plate 11. In one embodiment, there may be a ferrous plate across the top of the base plate 11 with the magnet 12 below it, distributing the magnetic force across the entire surface of the ferrous plate. In other embodiments the plate is a non-ferrous material. The base 11 may be made of any number of types of material, including, but not limited to, plastic, ferrous metal, or non-ferrous metal. The base 11 can be connected to the receiving surface utilizing any attachment mechanisms known in the art. As illustrated in FIG. 2A, in yet another preferred embodiment, the upper 21 and lower 22 plates may be comprised of a ferrous material.

In a preferred embodiment the volume 25 between the plates is sealed with a sealing element 23. This sealing element may be tape, rubber, adhesive, sealant, rubber, polymer, plastic, or other materials known to seal a space. The sealing element 23 may be further added to the single base design of FIG. 1A in order to create a lip as depicted on FIG. 2A.

Figure 3:
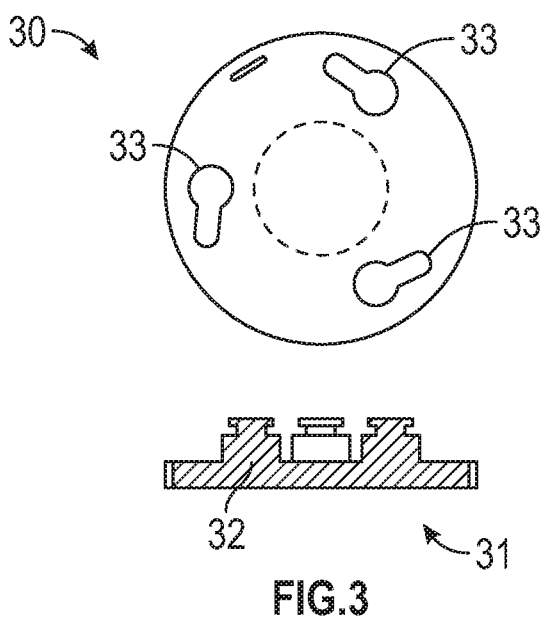
FIG. 3 is a cross-sectional view of one embodiment of a sub-base and a top view of a modified base according to the present invention.
Figure 4:
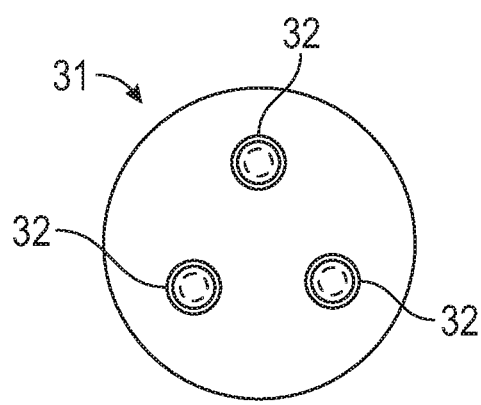
FIG. 4 is top view of one embodiment of the disclosed sub-base for connecting a volume holder to a modified base according to the present invention.

As illustrated in FIG. 3, a system comprising a modified plate 30 and a compatible sub-plate 31 is provided. The modified plate 30 may comprise a plurality of insertion points 33 for securing an attachment element 32 therein to secure the modified plate 30 to the sub-plate 31. As illustrated in FIG. 3, the modified base may comprise female attachment elements 33 configured to accept a male attachment element 32. The female attachment element 33 may be a key-hole configuration generally comprising an aperture having a first and second end, the first end resembling a first hole and the second end representing a larger hole, the two holes being connected by a channel therebetween. The male docking element 32 may comprise a pillar having an indentation and a top section having a circumference larger than said indentation. As illustrated in FIG. 4, the sub-plate 31 may comprise a plurality of male attachment elements 32 configured to align with the female attachment elements 33 of the modified plate 30. In the illustrated embodiment, a user may insert the male attachment elements 32 into the second end representing the larger hole of the female attachment elements 33. Once inserted, the modified plate 30 may be rotated such that the male attachment elements 32 are moved to the first end representing the smaller hole of the female attachment elements 33. This embodiment allows for the sub-plate 31 to be interchangeably connected to different modified plates 30. It is understood that the height, number and configuration of the female attachment elements 33 and male attachment elements 32 can be varied to accommodate the conditions of the environment in which the system is to be utilized. It is further understood that the female attachment elements may be located on the sub-plate 31 and the male attachment elements may be located on the modified plate 30.

Figure 5:
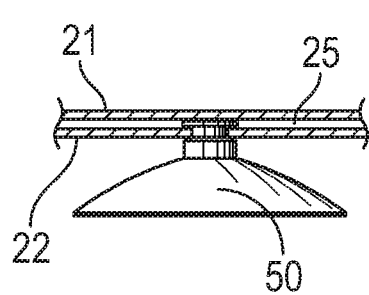
FIG. 5 is a side view of one embodiment of the disclosed base and suction cup for connecting a volume holder to a base according to the present invention.
Figure 6:
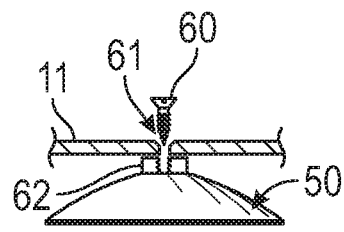
FIG. 6 is a side view of one embodiment of the disclosed base and suction cup for connecting a volume holder to a base according to the present invention.
Figure 7:
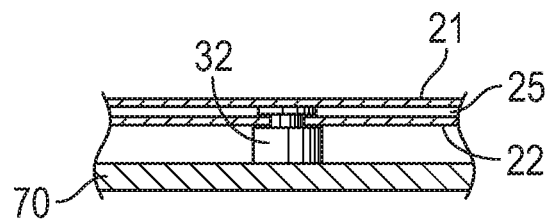
FIG. 7 is a side view of one embodiment of the disclosed base and attachment element for connecting a volume holder to a base according to the present invention.

The method and system further comprises other mechanisms for securing the base 10 to a surface. As illustrated in FIG. 5 and FIG. 6, the base 10 may be secured to a surface with suction cups 50. Depicted in FIG. 5, one embodiment of the current invention comprises a base 10 having a top plate 21, a bottom plate 22, and a volume of area 25 between the two plates. As illustrated, a suction cup 50 may be configured to be removably secured into the base by inserting a top section of the suction cup 50 into a cavity of the bottom plate 22. In a preferred embodiment, a suction cup 50 may have a similar configuration as the male attachment elements 33 depicted in FIG. 3. In yet another alternative embodiment, illustrated in FIG. 6, a suction cup is secured directly to the base 10 via a single plate 11. In this embodiment, the single plate 11 may comprise a cavity 61 configured to allow passage of a screw 60. The suction cup 50 may have a top section 62 configured to receive the screw 60. It is understood that the suction cups 50 may be secured to the base via snapping, hook and loop systems, adhesive, bolts, screws, anchors, and any other mechanisms known in the art. Alternative embodiments comprise a male attachment element 33 connected directly to a receiving surface 70, as illustrated in FIG. 7.

Figure 24:
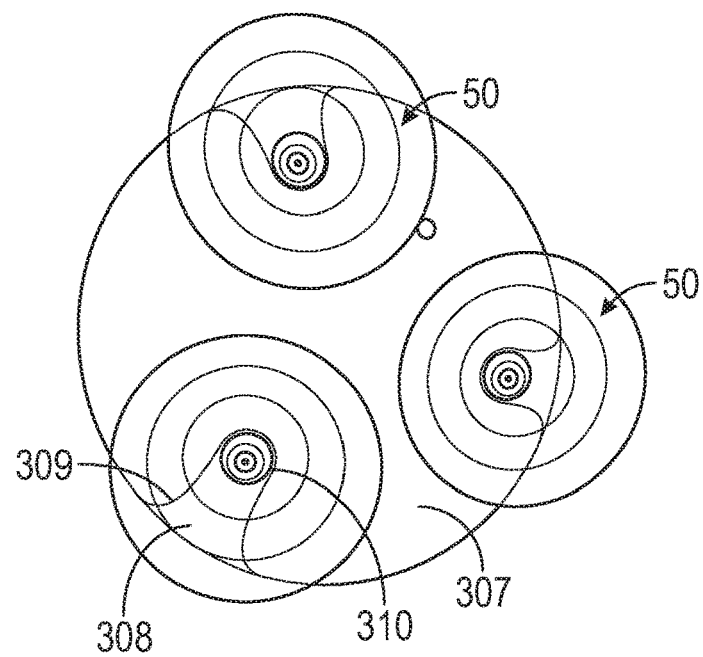
FIG. 24 is a bottom view of one embodiment of a base according to the present invention.

As illustrated in FIG. 24, suction cups 50 may be attached to a base 307. In this embodiment, female attachment elements are configured to extend from the edge of the base 307 towards the interior of said base. As illustrated in FIG. 24, the female attachment may comprise a larger cavity section 308 and a smaller cavity section 310. In use, a suction cup may be secured in the smaller cavity section 310 by pushing the suction cup 50 from the larger cavity section 308 to the smaller cavity section 310. It has been found that the attachment configuration illustrated in FIG. 24 is advantageous in some embodiments because rotation of the base is minimized. In certain preferred embodiment, as illustrated in FIG. 24, a rim 309 may exist between the larger cavity section 308 and smaller cavity section 310. The suction cup 50 may become secured to the base upon passing said rim 309.

Figure 8:
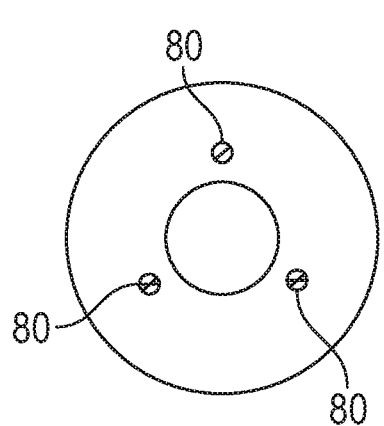
FIG. 8 is top view of one embodiment of the disclosed base for connecting a volume holder to a base according to the present invention.
Figure 9:
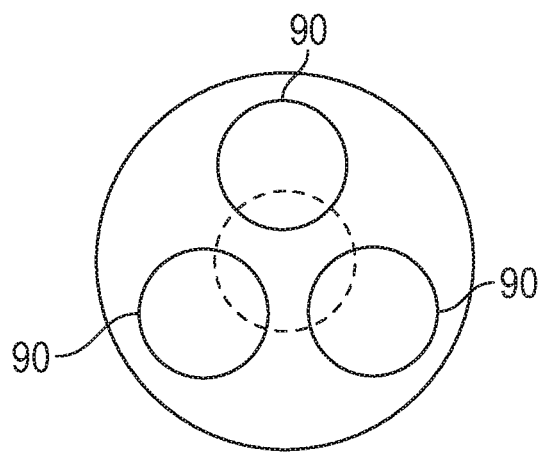
FIG. 9 is top view of one embodiment of the disclosed base for connecting a volume holder to a base according to the present invention.

In order to provide increased security, some embodiments comprise the base being secured in at least three locations to prevent rotation, as illustrated in FIG. 8, FIG. 9, FIG. 23, and FIG. 24. Other embodiments include only one connection point and do not require three connection points. Other embodiments may include a single sheet of adhesive. FIG. 8 depicts an embodiment of the current invention configured to accept semi-permanent attachments 80, such as screws, nails, and the like. FIG. 9 depicts the use of removable attachments 90, such as suction cups, adhesives, and the like. As shown in FIG. 8 and FIG. 9, some embodiments of the present invention comprise the attachment elements being located substantially outside of the center of the base. Other embodiments, do not require that the attachment element be located outside of the center of the base. For example, the base may be secured by center posts, adhesive across the bottom, adhesive sheets across the bottom, or similar attachment elements.

It should be understood that the base described above, and in greater detail below, may be utilized to attach to any ferrous material. As illustrated in the cross-sectional view of FIG. 10, a preferred embodiment of the present invention comprises a volume holder 100 having a ferrous material 101 attached thereto. The volume holder 100 may comprise a top 106, bottom 105, left side 107, and right side 108. The volume holder may further comprise an insulation material 109.

Figure 10:
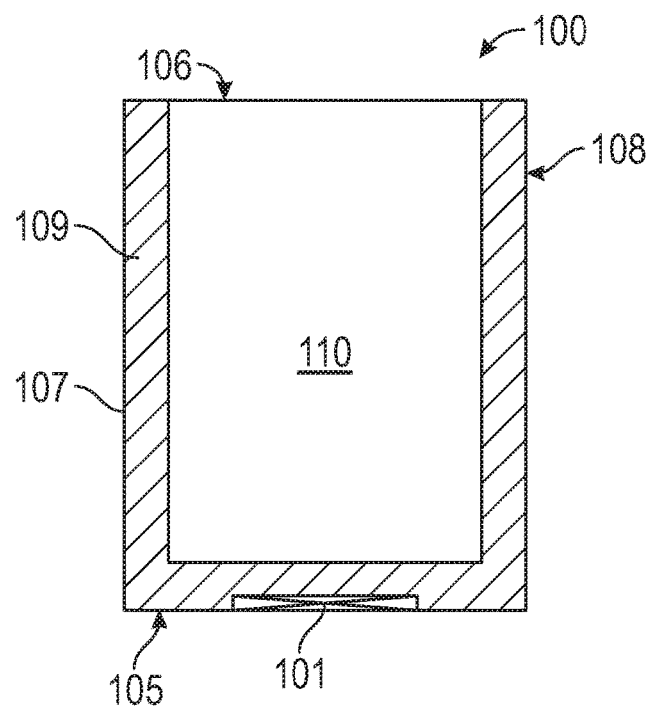
FIG. 10 is a cross-sectional view of one embodiment of the disclosed volume holder for connecting a volume holder to a base according to the present invention.

FIG. 10 through FIG. 13 illustrate alternative embodiments of a volume holder 100. FIG. 10 depicts the bottom 105 of the volume holder having a cavity for a ferrous material 101 to be inserted therein. As illustrated in the figure, it is preferred that the ferrous material 101 be located substantially in the center of the volume holder 100. Locating the ferrous material 101 in the center of the volume holder 100 assists with centering the volume holder 100 on the base 10 and has been found to create the optimal magnetic forces desired to firmly hold the volume holder in place while still allowing a user to remove the volume holder when needed. However, it is understood that other embodiments of the current invention may comprise the ferrous material located outside of the center of the volume holder. Other embodiments may comprise the ferrous material configured to cover substantially all of the bottom area of the volume holder. In some embodiments the ferrous material may comprise a hole located substantially in the center of said ferrous material.

Figure 11:
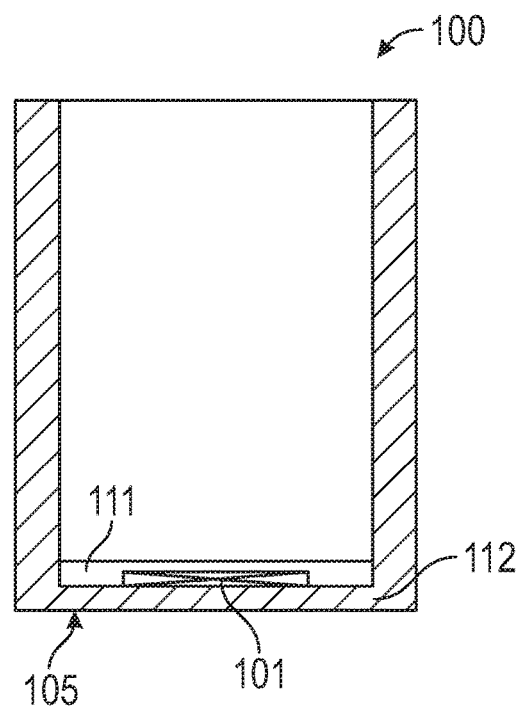
FIG. 11 is a cross-sectional view of one embodiment of the disclosed volume holder for connecting a volume holder to a base according to the present invention.
Figure 12:
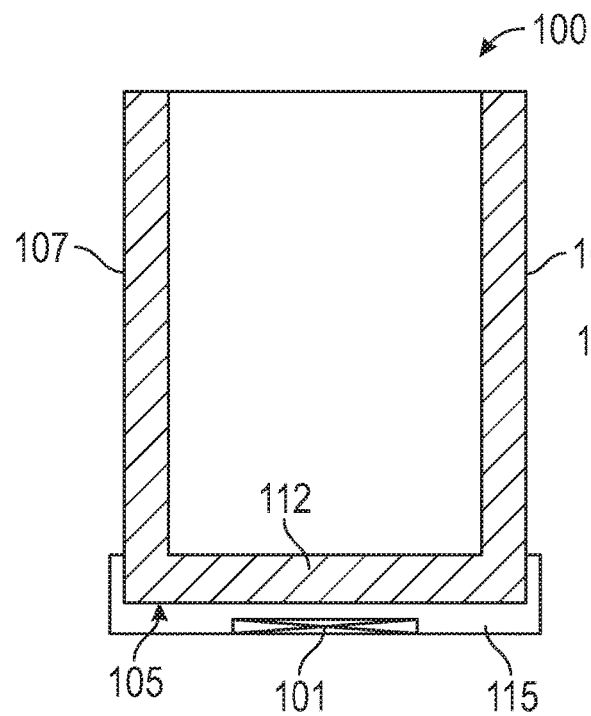
FIG. 12 is a cross-sectional view of one embodiment of the disclosed volume holder for connecting a volume holder to a base according to the present invention.

FIG. 11 is an alternative embodiment of a volume holder 100 in which the ferrous material is located above the bottom 105 of the volume holder. In this embodiment a ferrous material 101 may be secured within the interior area of the volume holder 100. The device may further comprise a sealing element 111 for securing the ferrous material 101 therein. In yet another embodiment, as illustrated in FIG. 12, the volume holder 100 may comprise a ferrous material attachment element 115. In this embodiment, a ferrous material 101 is configured within the ferrous material attachment element 115. In yet another embodiment, the ferrous material attachment element 115 is comprised substantially of a ferrous material. The ferrous material attachment element 115 is generally located towards the bottom 105 of the volume holder 100. The ferrous material attachment element 115 may extend up and attach to the left side 107 and right side 108 of the volume holder 100. In alternative embodiments the ferrous material attachment element 115 is removably secured to the volume holder 100. In this embodiment, the removeable ferrous material attachment element 115 may be used to attach to volume holders not having a ferrous bottom in order that the volume holder may be compatible with the system.

Figure 13:
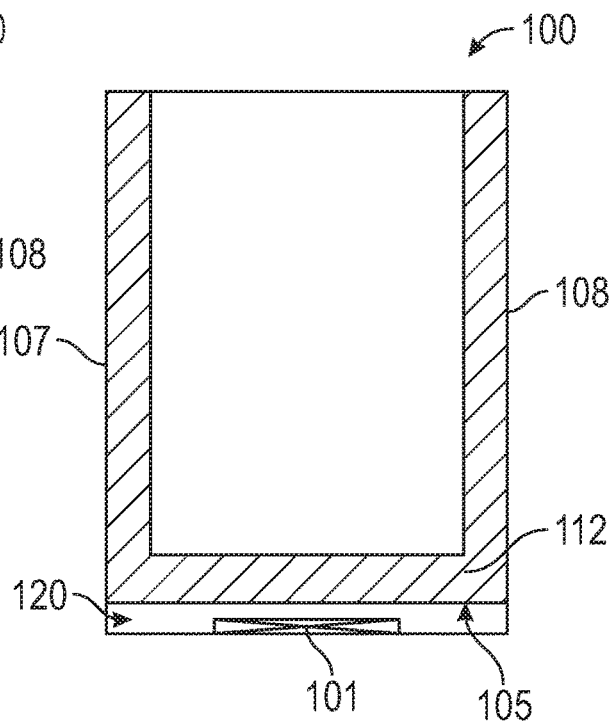
FIG. 13 is a cross-sectional view of one embodiment of the disclosed volume holder for connecting a volume holder to a base according to the present invention.

FIG. 13 illustrates an embodiment of the volume holder 100 in which the ferrous material attachment element 120 is secured to the bottom 105 of the volume holder 100. In this embodiment, the ferrous material 101 is configured within the ferrous material attachment element 115 and located substantially near the bottom of the ferrous material attachment element 115. In alternative embodiments the ferrous material attachment element 115 may be removably secured to a volume holder 100.

In yet another embodiment the ferrous material is affixed to the outside of the bottom 105 of the volume holder 100. In some embodiments there is not a cavity for inserting the ferrous material.

Turning now to FIG. 14-16, a system and method for securing a volume holder 100 to a base 10 is provided. FIG. 14 illustrates a volume holder 100 secured to the base 10. The volume holder 100 comprises a ferrous material 101 located substantially near the bottom of the volume holder 100 or exterior to the bottom. The base comprises a magnet 12 secured to a surface. Once the volume holder is placed near the base, magnetic forces between the magnet 12 and ferrous material 101 cause the volume holder and base to attach.

FIG. 15A-C illustrate the method in which the system described herein is self-centering and self-leveling. FIG. 15A depicts a substantially flat base 10 having a magnet 12 attached therein. The volume holder 100 has a ferrous material therein. As illustrated in FIG. 15A, the volume holder 100 may be placed a short distance away from the center of the base and at an angle. As illustrated and preferred, the location of the magnet 12 and ferrous material 101 in the center of the base 10 and volume holder 100, respectively, cause the magnetic forces between the volume holder 100 and base 10 to attract. Illustrated in FIG. 15B, as the magnetic forces attract, the ferrous material 101 of the volume holder 100 moves closer to the magnet 12 of the base 10. This attraction of the magnetic forces, along with the flat surface of the base, causes the volume holder to erect and align with the base. The volume holder continues moving, due to magnetic forces, until the ferrous material 101 of the volume holder 100 is centered above the magnet 12 of the base 10. As illustrated in FIG. 15C, the volume holder 100 will be secured on the base at its strongest magnetic attraction once the ferrous material 101 of the volume holder 100 and the magnet 12 of the base 10 are centered.

Figure 19:
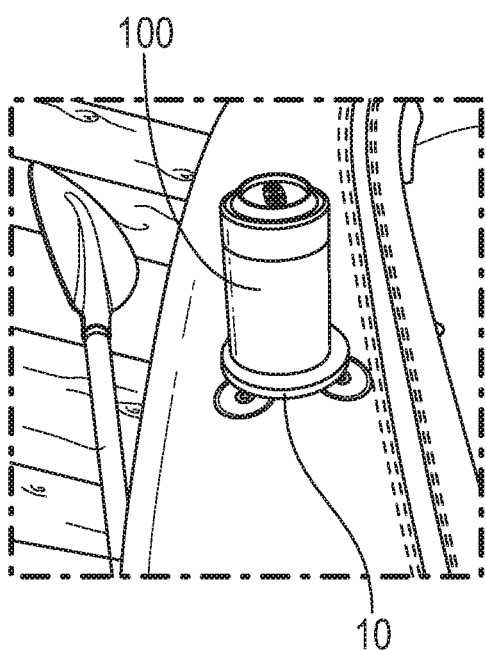
FIG. 19 illustrates one embodiment of a volume holder and base system used in a recreational setting according to the present invention.
Figure 20:
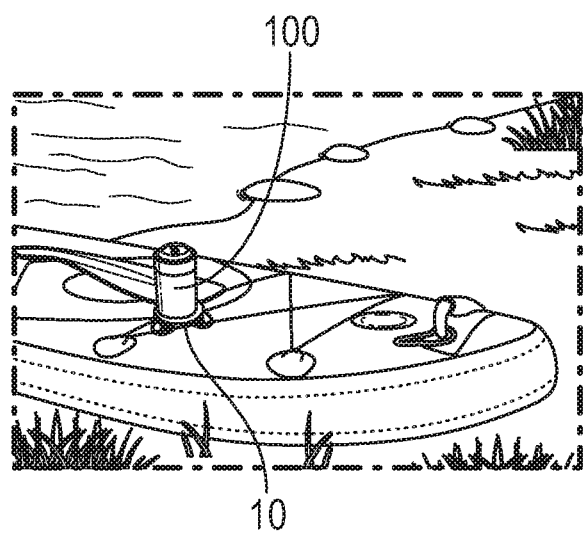
FIG. 20 illustrates one embodiment of a volume holder and base system used in a recreational setting according to the present invention.

FIG. 16A-C illustrate the system in use at different angles relative to a surface. FIG. 16A depicts a water rafting tube 160 with a base 10 and volume holder 100 secured thereto. FIG. 16A depicts the tube of the raft in calm water conditions. FIG. 16B depicts the tube of a raft in turbulent conditions, possibly caused by whitewater rapids. FIG. 16C depicts the tube of the raft turned upside down, possibly cause by a capsizing event. As illustrated in FIGS. 16A, 16B, and 16C, the connection between the base 10 and volume holder 100 remains intact and strong, regardless of the angle 162, 163, 164 of the tube relative the surface. As such, the bond of the base 10 and volume holder 100 is not dependent on specific orientations or angles relative to the surface. This advancement is especially important when utilizing the base 10 and volume holder 100 in outdoor activities. As illustrated in FIG. 19 and FIG. 20, embodiments of the current invention may be utilized on many types of recreational devices, including, but not limited to, water rafts, paddle boards, surfboards, canoes, kayaks, all-terrain vehicles, lawn mowers, golf carts, and the like.

Figure 17:
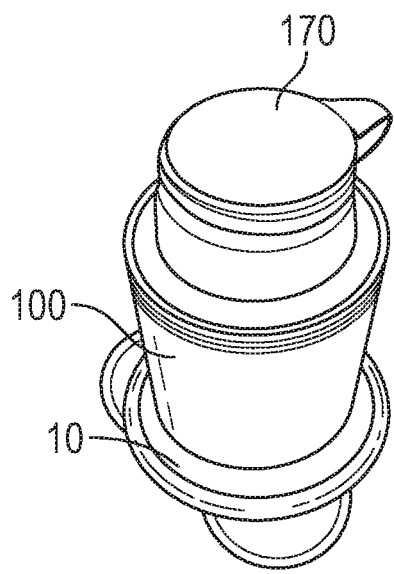
FIG. 17 is a perspective view of one embodiment of a volume holder and base system according to the present invention.

FIG. 17 illustrates an embodiment of a volume holder management and retention system according to one embodiment of the invention. As illustrated, the system may comprise a base 10 with polyurethane rimmed suction cups 50 for securing the base to a receiving surface. The system further comprises a volume holder 100 and a snap on lid 170. Instead of polyurethane, the system and method may utilize, without limitation, other flexible, gummy material, or other pliable material that allows for or enhances adhesion of the suction cup 50 to surfaces, including textured surfaces.

Figure 18:
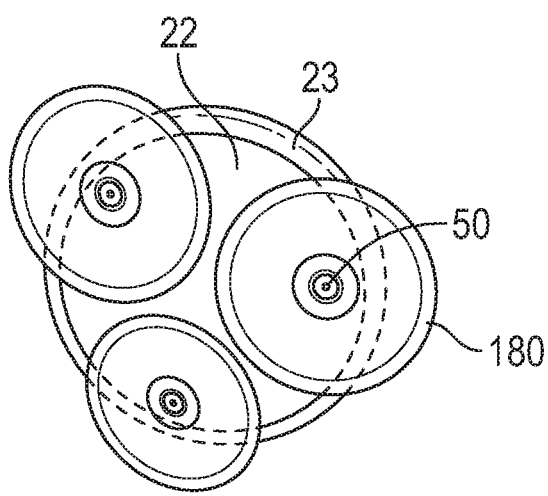
FIG. 18 is a bottom perspective view of one embodiment of a base according to the present invention.

It has been found that various types of suction cups 50 may be utilized with the invention. As illustrated in FIG. 18, one embodiment of the base may comprise suction cups having an outer rim 180 having a polyurethane coating thereon. In yet other embodiments, the bottom surface of the suction cup may be treated with a polyurethane coating. In yet other embodiments, the suction cup may be treated with another material exhibiting adhesive properties.

Figure 22:
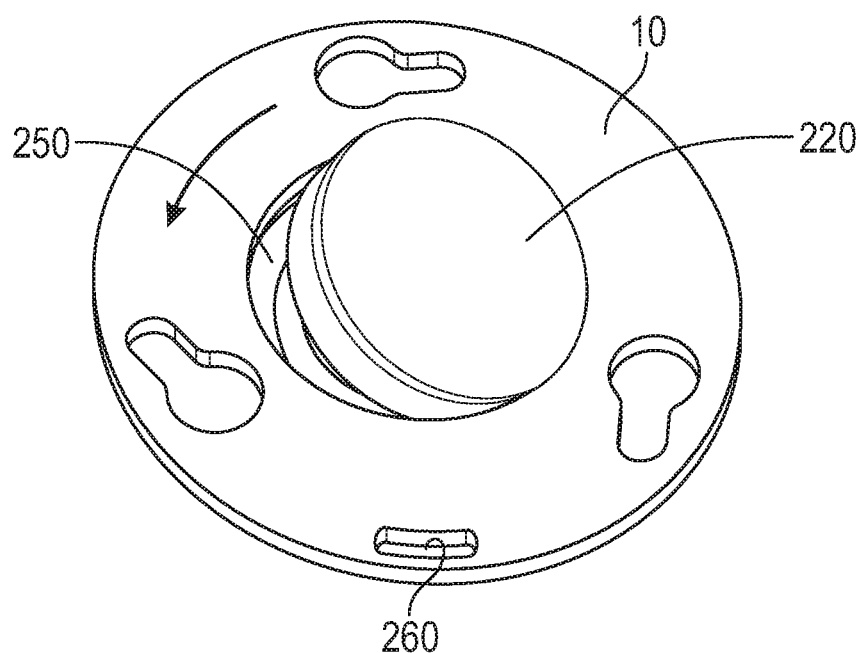
FIG. 22 is a bottom perspective view of one embodiment of a base according to the present invention.

FIG. 21 and FIG. 22 illustrate preferred embodiments of a base 10 having a cavity 250 therein. As shown, it is preferred that the cavity 250 be formed such that a magnet 220 may fit within said cavity 250. In some embodiments, as illustrated in FIG. 21, the cavity 250 may include a guide element 210. The guide element 210 may have many purposes, including, but not limited to securing or centering the magnet 220.

FIG. 21 and FIG. 22 further illustrate a retention attachment element 260 in which, in some embodiments, a retention strap may be connected to said retention attachment element 260. This retention strap may then be connected to handles, buckles, loops, carabiners, or other points in order to preserve the base in the case that said base is dislodged during use.

Figure 23:
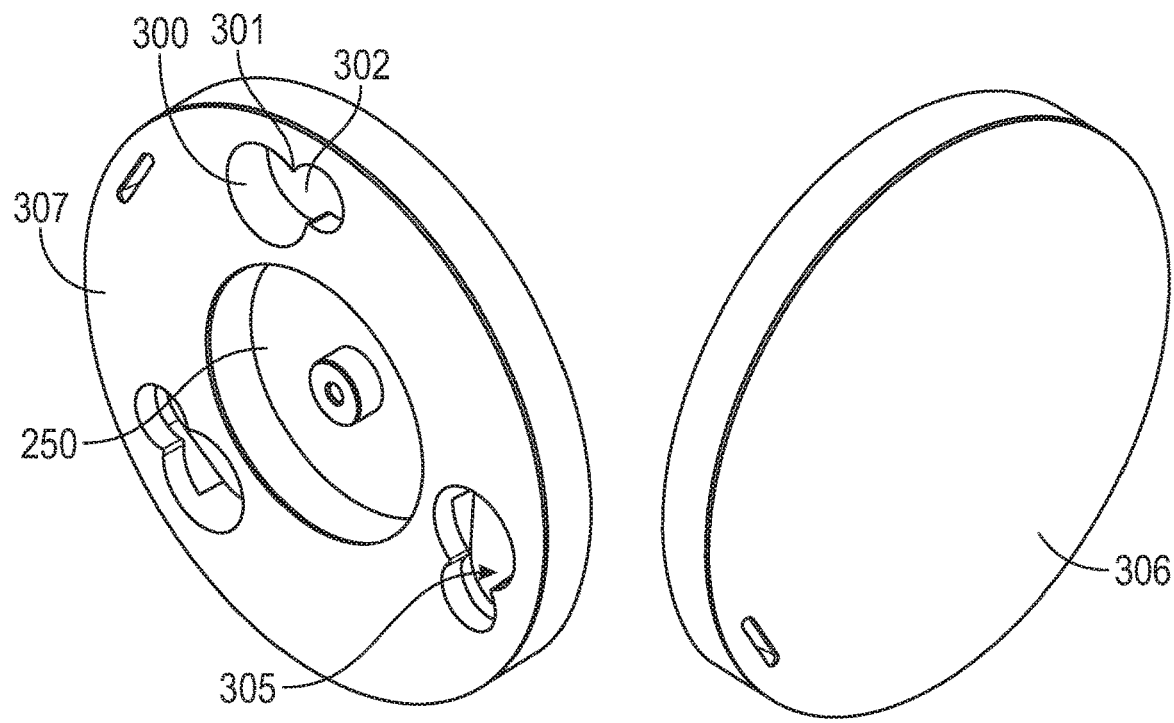
FIG. 23 is a bottom perspective view and top perspective view of one embodiment of a base according to the present invention.

FIG. 23 illustrates a preferred embodiment of a base having a front side 306 and bottom side 307. In some embodiments the base illustrated in FIG. 23 may be a unitary piece of material. As illustrated, the bottom side 307 of said base may comprise a plurality of female attachment elements. The female attachment elements may be modified keyhole cavities 305. These modified keyhole cavities 305 may comprise a smaller port 302 and a larger port 300. There may be a rim 301 between the smaller port 302 and a larger port 300. As illustrated in FIG. 23, the modified keyhole cavities 305 may be configured such that indentations exists between the bottom side 307 and top side 306 of said base. These indentations, as illustrated, are configured to secure the top of a securing element, such as a suction cup. In one preferred embodiment, the indentation is smaller in the smaller port 302 than the larger port 300. In use, the top of a suction cup is placed in the larger port 300 and pushed towards the smaller port 302. In so doing, the suction cup is secured in the indentation of said smaller port 302 once it passes said rim 301.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, devices, and arrangements of the parts and method stages which have been described and illustrated in order to explain the nature of this inventive subject matter can be made without departing from the principles and scope of the inventive subject matter.

What is claimed is:

1. A system for securing a volume holder having ferromagnetic properties comprising:
   a base having a plurality of insertion points located on a bottom surface of a bottom end,
      wherein a top end of said base has a top surface that is substantially flat from edge to edge,
      wherein said top end of said base is oriented furthest away from a receiving surface when said base is attached to said receiving surface,
      wherein said plurality of insertion points are configured to accept a plurality of attachment elements,
      wherein said plurality of attachment elements removably secure said base to said receiving surface,
      wherein said plurality of attachment elements are reusable such that said base may be resecured to said receiving surface after removal from said receiving surface,
   a magnet cavity extending from said bottom end towards said top end,
      wherein said magnet cavity is in a central position of said base,
      wherein said magnet cavity is accessible via a cavity opening of said bottom end, and
      wherein at least one magnet is oriented in a way within said magnet cavity such that a magnetic force of said at least one magnet attracts a ferrous material of a volume holder placed on said top surface,
      wherein a base surface of said volume holder is substantially flat from edge to edge and configured to removably attach to said top surface, and
   a cover plate configured to conceal said cavity opening and said at least one magnet.

2. The system of claim 1, further comprising a guide element of said magnet cavity.

3. The system of claim 1, further comprising said volume holder having said ferrous material,
   wherein a volume opening located at an upper end of said volume holder allows for contents to be placed within a cavity of said volume holder,
   wherein said cavity extends from said upper end towards a lower end, wherein said ferrous material of said volume holder is acted upon by said at least one magnet in a way such that said lower end of said volume holder is secured to said top end of said base.

4. The system of claim 3, wherein said ferrous material is located at said lower end of said volume holder.

5. The system of claim 1, wherein said plurality of insertion points are female insertion points comprising a larger port, rim, and smaller port, wherein said plurality of attachment elements are male attachment elements, wherein said male attachment elements are inserted into said larger port of said insertion point and secured within said smaller port of said insertion point.

6. The system of claim 5, wherein said plurality of attachment elements is a suction cup, wherein said suction cup is secured to said base when a male member of said suction cup is pushed from said larger port of said female insertion points to said smaller port of said female insertion points.

7. The system of claim 1, comprising three or more of said plurality of insertion points spaced equidistance apart about said bottom end.

8. A system for securing a volume holder having ferromagnetic properties comprising:
a base having a plurality of attachment elements on a bottom surface of a bottom end,
wherein a top end of said base has a top surface that is substantially flat from edge to edge,
wherein said top end of said base is oriented furthest away from a receiving surface when said base is attached to said receiving surface,
wherein said plurality of attachment elements removably secure said base to said receiving surface,
wherein said plurality of attachment elements are reusable such that said base may be resecured to said receiving surface after removal from said receiving surface,
at least one magnet located within a magnet cavity of said base and oriented in a way within said magnet cavity such that a magnetic force of said at least one magnet attracts a ferrous material placed on said top surface,
wherein said magnet cavity is accessible via a cavity opening of said bottom end, and
a volume holder having said ferrous material,
wherein a volume opening located at an upper end of said volume holder allows for contents to be placed within a cavity of said volume holder,
wherein said cavity extends from said upper end towards a lower end,
wherein said ferrous material of said volume holder is acted upon by said at least one magnet in a way such that said lower end of said volume holder is secured to said top end of said base,
wherein a base surface of said volume holder located at said lower end is substantially flat from edge to edge and configured to removably attach to said top surface.

9. The system of claim 8, further comprising a guide element within said magnet cavity.

10. The system of claim 9, further comprising a cover plate,
wherein said cover plate conceals said at least one magnet within said magnet cavity.

11. The system of claim 8, wherein said ferrous material is located at said lower end of said volume holder.

12. The system of claim 8, further comprising female insertion points on said bottom end,
wherein said plurality of attachment elements are configured to be secured to said base via female insertion points,
wherein said female insertion points comprise a larger port, rim, and smaller port,
wherein said plurality of attachment elements are male attachment elements,
wherein said male attachment elements are inserted into said larger port of said insertion point and secured within said smaller port of said insertion point.

13. The system of claim 12, wherein said plurality of attachment elements is a suction cup, wherein said suction cup is secured to said base when a male member of said suction cup is pushed from said larger port of said female attachment points to said smaller port of said female attachment points.

14. The system of claim 8, comprising three or more insertion points spaced equidistance apart about said bottom surface.

15. A system for securing a volume holder having ferromagnetic properties comprising:
a base having a plurality of insertion points,
wherein a top end of said base has a top surface that is substantially flat from edge to edge,
wherein said top end of said base is oriented furthest away from a receiving surface when said base is attached to said receiving surface,
a plurality of suction cups attached to a bottom end of said base via female insertion points,
wherein said female insertion points comprise a larger port, rim, and smaller port,
wherein said plurality of suction cups is secured to said base when a male member of said plurality of suction cups is pushed from said larger port of said female insertion points to said smaller port of said female insertion points, and
at least one magnet secured to said base within a magnet cavity,
wherein said at least one magnet is oriented in a way such that a magnetic force of said at least one magnet attracts a ferrous material placed on said top surface,
wherein removal of a cover plate on said bottom end reveals said magnet cavity.

16. The system of claim 15, further comprising a guide element within said magnet cavity.

17. The system of claim 15, further comprising a volume holder having said ferrous material,
wherein a volume opening located at an upper end of said volume holder allows for contents to be placed within a cavity of said volume holder,
wherein said cavity extends from said upper end towards a lower end of said volume holder,
wherein said ferrous material of said volume holder is acted upon by said at least one magnet in a way such that said lower end of said volume holder is secured to said surface of said base.

18. The system of claim 15, comprising three or more of said plurality of insertion points spaced equidistance apart about said bottom end.

* * * * *